(12) United States Patent
Klemann (10) Patent No.: US 8,133,638 B2
(45) Date of Patent: Mar. 13, 2012

(54) ALL-POLYMER GRATING MICROSTRUCTURE

(75) Inventor: Bruce M. Klemann, Shorewood, WI (US)

(73) Assignee: Brady Worldwide, Inc., Milwaukee, WI (US)

(*) Notice: Subject to any disclaimer, the term of this patent is extended or adjusted under 35 U.S.C. 154(b) by 1333 days.

(21) Appl. No.: 11/420,934

(22) Filed: May 30, 2006

(65) Prior Publication Data
US 2007/0279745 A1 Dec. 6, 2007

(51) Int. Cl.
G02B 5/08 (2006.01)
B42D 15/00 (2006.01)

(52) U.S. Cl. ......... 430/1; 430/2; 430/320; 430/321; 359/3; 359/569; 359/566; 359/576; 264/1.31

(58) Field of Classification Search .......... None
See application file for complete search history.

(56) References Cited

U.S. PATENT DOCUMENTS

| | | | |
|---|---|---|---|
| 3,703,407 A * | 11/1972 | Hannan et al. ............ 359/3 |
| 3,957,354 A | 5/1976 | Knop |
| 4,057,326 A * | 11/1977 | Knop ............ 359/568 |
| 4,251,137 A | 2/1981 | Knop et al. |
| 4,400,057 A * | 8/1983 | Moraw et al. ............ 359/575 |
| 4,484,797 A * | 11/1984 | Knop et al. ............ 359/568 |
| 4,506,949 A | 3/1985 | Knop |
| 4,568,141 A | 2/1986 | Antes |
| 4,576,439 A | 3/1986 | Gale et al. |
| 4,856,857 A * | 8/1989 | Takeuchi et al. ............ 359/3 |
| 5,543,228 A * | 8/1996 | Taniguchi et al. ............ 428/429 |
| 5,760,961 A * | 6/1998 | Tompkin et al. ............ 359/576 |
| 6,350,945 B1 * | 2/2002 | Mizuno ............ 136/246 |
| 6,417,968 B1 | 7/2002 | Staub et al. |
| 6,906,861 B2 | 6/2005 | Tompkin et al. |
| 7,755,835 B2 * | 7/2010 | Stuck et al. ............ 359/569 |
| 7,782,509 B2 * | 8/2010 | Walter et al. ............ 359/2 |
| 7,787,182 B2 * | 8/2010 | Stuck et al. ............ 359/569 |
| 7,821,691 B2 * | 10/2010 | Walter et al. ............ 359/2 |
| 7,864,424 B2 * | 1/2011 | Stuck et al. ............ 359/569 |
| 7,974,010 B2 * | 7/2011 | Walter et al. ............ 359/562 |
| 2004/0032667 A1 | 2/2004 | Gale et al. |
| 2004/0166336 A1 * | 8/2004 | Lindvold et al. ............ 428/457 |
| 2005/0082819 A1 | 4/2005 | Tompkin et al. |
| 2006/0072225 A1 | 4/2006 | Schilling et al. |
| 2006/0274995 A1 * | 12/2006 | Lee et al. ............ 385/37 |
| 2007/0247714 A1 * | 10/2007 | Schnieper et al. ............ 359/558 |

FOREIGN PATENT DOCUMENTS

| | | | |
|---|---|---|---|
| JP | 02-181777 | * | 7/1990 |
| JP | 04-121701 | * | 4/1992 |
| JP | 2003-084134 | * | 3/2003 |
| WO | 2006/016265 | * | 2/2006 |
| WO | 2006016265 A1 | | 2/2006 |
| WO | 2006/038120 | * | 4/2006 |

OTHER PUBLICATIONS

Gale et al."zero-order diffractive microstructures for security applications", Proc. SPIE vol. 1210 pp. 83-89 (1990).*

(Continued)

Primary Examiner — Martin Angebranndt
(74) Attorney, Agent, or Firm — Whyte Hirschboeck Dudek SC (57) ABSTRACT

An all-polymer grating microstructure device that exhibits a zero-order reflection under white light comprises a first polymer having a first refractive index and configured as a microstructure embedded within a second polymer having a second refractive index, each of the polymers of the first and second polymers at least translucent to white light with the proviso that the refractive index of the first polymer is at least 0.05 greater than the refractive index of the second polymer.

26 Claims, 3 Drawing Sheets

OTHER PUBLICATIONS

Tompkin et al., "Zero order grating for optically variable devices", Proc. SPIE vol. 4677 pp. 227-237 (2002).*

Vukusic, P., et al., Quantified Interference and Diffraction in Single Morpho Butterfly Scales, Proceedings of the Royal Society of London B, 266, 1403-1411 (1999).

Lawrence, Chris et al., Grazing-Incidence Iridescence from a Butterfly Wing, Applied Optics, vol. 41, No. 3, 437-441, Jan. 20, 2002.

Optical Document Security, 2nd Edition, Artech House, Boston, 1998, Chapters 4, 10 and 12.

* cited by examiner

ALL-POLYMER GRATING MICROSTRUCTURE

FIELD OF THE INVENTION

This invention relates to optically variable devices (OVDs). In one aspect, the invention relates to overt OVDs while in another aspect, the invention relates to overt optically variable security devices. In still another aspect, the invention relates to optically variable security devices that are buried or embedded grating microstructures while in yet other aspects, the invention is a method of forming a buried grating microstructure and an article comprising such a structure.

BACKGROUND OF THE INVENTION

While optically variable devices have a number of uses, e.g., packaging, decorative applications, etc., these devices have found significant use in various security devices. Security devices are used to protect a variety of valuable objects such as currencies, financial documents, travel and identification papers, and branded products. The primary function of these devices is to prevent counterfeiting, and thus these devices are designed to make the replication of the article to which they are attached difficult and/or expensive.

Security devices are classified by the manner in which they are authenticated. First level or firstline inspection refers to features of the security device that are checked directly through a user's senses, typically the user's tactile or visual senses. Common examples of such features include color-shifting inks, holograms and intaglio print. Since these types of security devices do not rely upon the use of equipment for detection, they are commonly known as overt security devices.

Security devices that are designed to be shielded or hidden from direct sensory detection by the user of the article to which the device is attached are commonly known as covert security devices. If only simple tools or equipment, e.g., a magnifying glass, ultraviolet light or a polarizing sheet, are needed for detection, then the security device is classified as a second-line or second-level device. Various industry personnel, such as bank tellers, cashiers and first-line government workers who do not require extensive training, typically perform these types of inspections. Second-level features include ultraviolet fluorescent inks, polarized images, bar codes and magnetic inks. Third-line or third-level security devices are those that require forensic specialists and/or sophisticated laboratory equipment to detect.

OVDs are a particular class of overt security devices. These devices (or technologies) are constructions of multiple materials that change color or appearance depending upon the angle from which they are viewed. Devices that change their appearance due to changes in the tilt angle are more common than those devices that change color or appearance upon rotation. Most OVDs are appropriate for first-line inspection with the human eye. Examples of such OVDs include metameric colors, three-dimensional tilt images, parallax images, lenitcular images, holograms, kinegrams and zero-order devices.

Currently holograms are the dominant OVD used for the protection of consumer goods. They appear on credit cards, various documents and currency, and an assortment of branded products. Effective as they are, holograms have a number of drawbacks as security devices.

One such drawback is that diffuse lighting reduces the brilliance of holographic images and as such, they often appear dim and blurry under fluorescent light or an overcast sky. Another drawback is that dark colors, especially black, are excluded from the color gamut. Yet another drawback, and one more significant than most others, is their susceptibility to counterfeiting.

Embossed holograms can be stripped from the substrate to which they are attached to permit a tooling replication. Holograms typically comprise at least one polymer layer overriding a metal layer. The polymer layer or layers can be stripped from the hologram to expose the metal layer, and a contact process can then replicate the metal layer. Photopolymer volumetric holograms cannot be counterfeited physically, but they can be copied optically as can most planar or multi-planar holograms.

Buried grating microstructures offer a solution to this hologram replication problem. These microstructures comprise a three-dimensional structure of grating lines with a high index of refraction buried or embedded in a material with a low index of refraction. When the length of the grating lines are on the order of or shorter than the wavelength of light that penetrates these lines, these microstructures exhibit a peculiar specular or zero-order reflection that is different for light polarized parallel to the grating lines than for light polarized perpendicular to the grating lines. The result is that the color observed in reflection or transmission changes when the surface of the object in which the grating lines are embedded is rotated or tilted. The color change observed upon rotation is a unique feature of zero-order gratings; for many OVDs color change is observed only when the structure is tilted, not rotated. The reflected colors are bright and clear even under diffuse light. The buried grating is an integral part of the structure and as such, it cannot be separated from the structure. Moreover, it is resistant to both mechanical and optical copying techniques (the latter because the optical behavior of the device is determined by the physical variations in the refractive index of the device, and these variations are not susceptible to optical copying).

The components of known zero-order grating microstructures are a low refractive index polymer and a high refractive index ceramic material. See, for example, van Renesse, R. L., *Optical Document Security*, $2^{nd}$ Ed., pp. 267-286, Artech House Publishers, Boston (1997). The ceramic material is typically slope-evaporated onto the polymer under vacuum. This is a relatively expensive and slow process and, at least in part, it is the reason for the presently limited uses of these microstructures in commerce.

SUMMARY OF THE INVENTION

In a first embodiment of this invention, an all-polymer grating microstructure device that exhibits a zero-order reflection under white light comprises a first polymer having a first refractive index and configured as a microstructure embedded within a second polymer having a second refractive index, each of the polymers of the first and second polymers at least translucent to white light with the proviso that the refractive index of the first polymer is at least 0.05 greater than the refractive index of the second polymer.

In a second embodiment, the all-polymer grating microstructure device is a multi-layer device comprising as a first layer an opaque substrate having first and second planar surfaces, and a second layer comprising (i) a first polymer having a first refractive index and configured as a microstructure embedded within a second polymer having a second refractive index, and (ii) first and second planar surfaces, the second planar surface of the second layer in intimate contact with the first planar surface of the substrate, and each of the first and second polymers of the second layer at least translucent to white light with the proviso that the refractive index of the first polymer is at least 0.05 greater than the refractive index of the second polymer.

Although the devices of this invention are usually designed to exhibit a zero-order reflection under white light, these devices can be designed to exhibit a zero-order reflection under other forms of electromagnetic radiation, e.g., UV-light, infrared, etc. as well. In these instances, the polymeric layers of the device need not be at least translucent to white light and the index is not a measure of white light refraction, but rather the polymer layers are at least translucent to and the index is a measure of refraction of the electromagnetic radiation for which the device is designed.

The devices of this invention can contain additional layers either below or above the layer containing the microstructure. If below the layer containing the microstructure, then the additional layer or layers are usually between the substrate layer and the layer containing the microstructure. The device can contain more than one layer containing a microstructure, and the microstructures can have any planar orientation with respect to one another, e.g., parallel, nonparallel and intersecting.

Typically all layers of the device are polymeric, i.e., comprise one or more polymers, although the substrate layer, if present, may comprise a material other than a polymer, e.g., paper or foil. These polymeric layers can be neat or contain one or more fillers and/or voids. The fillers can be organic or inorganic, and typically have particle sizes small enough that they do not appreciably scatter visible light, so that the refractive index of the polymer/filler mixture is approximately the volume average of the refractive indices of the respective polymer and filler phases. The polymer layers usually comprise a single polymer, but they can comprise a blend of two or more polymers.

The microstructure usually comprises a series of grating lines and for white light refraction, the lines are usually spaced apart from one another by about 100 to about 900 nanometers (nm), more typically by about 200 to about 500 nm. The grating lines can have any cross-sectional shape, e.g., circular, rectangular, etc., and they typically lie parallel to one another. The grating lines can lie all in one plane or level within the polymer in which they are embedded, or within different planes or levels within the embedding polymer. The gaps or spaces between the grating lines of a microstructure can either be void or free of polymer, but more typically are filled with the embedding polymer or, in some instances, with another polymer that also has a refractive index that is at least 0.05 less than the refractive index of the polymer comprising the microstructure.

In a third embodiment of the invention, the all-polymer grating microstructure device is attached to or is made a part of an article, typically as a security device. If attached, the device is typically affixed with a suitable adhesive, e.g., a pressure sensitive or hot-melt adhesive. If made a part of an article, the device is typically embedded into the article during the manufacture of the article, either as a discrete unit or simply created in situ. Examples of these articles include documents, currency, labels, credit and/or debit cards, personal identification papers, stampable foils and the like.

In a fourth embodiment, the invention is a method of forming an all-polymer grating microstructure device that exhibits a zero-order reflection under white light, the method comprising the steps of:

A. Providing a substrate having a planar surface;
B. Coating the planar surface of the substrate with a first polymer having a first refractive index to form a first polymer layer having first and second planar surfaces, the second planar surface of the first polymer layer in intimate contact with the planar surface of the substrate;
C. Coating the first planar surface of the first polymer layer with a second polymer having a second refractive index to form a second polymer layer having first and second planar surfaces, the second planar surface of the second polymer layer in intimate contact with the first planar surface of the first polymer layer; and
D. Forming a microstructure in the first polymer layer from the second polymer of the second polymer layer;

each of the polymer layers at least translucent to white light with the proviso that the refractive index of the second polymer is at least 0.05 greater than the refractive index of the first polymer. Optionally and preferably, the first planar surface of the second polymer layer is coated with a third polymer having a third refractive index to form a third polymer layer with first and second planar surfaces, the second planar surface of the third polymer layer in intimate contact with the first planar surface of the second polymer layer. Typically, the third polymer layer will fill any gaps in the first and second polymer layers that were created as a result of forming and embedding the microstructure in the first polymer layer. Typically, the third polymer is the same as the first polymer. In this particular embodiment, the microstructure is preferably formed by an embossing technique.

In certain variations on this fourth embodiment, the microstructure is formed by printing the microstructure either onto the substrate surface or a polymer layer covering, either directly or indirectly, the substrate, and then covering/burying the microstructure with a covering polymer. In these variations, the microstructure is printed with an ink comprising the second polymer, and the other polymer layers comprise the first polymer and, optionally, one or more other polymers.

In certain other variations on this fourth embodiment, the microstructure is formed by photolithography. In these variations the second polymer is first masked to protect during the etching process those parts of the polymer layer which will form the microstructure, and then the microstructure is coated/buried with/in an overlay polymer, with or without removal of the mask layer remaining after the etch process step (removal of the mask dependent upon such factors as the refractive index of the mask, the thickness of the mask, etc.).

Strong anisotropic optical properties are exhibited by the all-polymer, zero-order grating microstructure devices of this invention designed for use under white light. These devices exhibit strong spectral reflection peaks that split when viewed at non-normal incidence to create well-defined shifts in color when the device is tilted or rotated. The encapsulated or buried microgate structure consists of periodic inclusions of a high refractive index polymer in a matrix of low refractive index polymer, and this structure is secure against optical and mechanical copying. Only replication of the entire microstructure with materials that match the refractive indices of the polymers will allow for replication of the optical effects. The use of polymers for both phases, i.e., for both the high and low refractive index materials of construction, allows for continuous roll-to-roll manufacture at ambient pressure as opposed to batch processes that include steps that must be conducted under vacuum. The optical and physical characteristics of these inventive microstructures make them ideal for use in overt security devices, and these devices can be attached to or incorporated into such articles as labels, documents, currency, credit cards, personal identification papers or materials (e.g., passports, driver licenses, etc.) and the like.

BRIEF DESCRIPTION OF THE DRAWINGS

Many aspects of the invention will be better appreciated and understood in conjunction with the following drawings and detailed description of the invention in which like reference numerals generally represent like elements.

DETAILED DESCRIPTION OF THE INVENTION

As used in the description of the invention, the following terms, and terms similar to these terms, are defined as follows:

"Layer" means a single thickness, coating or stratum. Each microstructure is contained within a single polymer layer even though the microstructure itself may comprise multiple planes or levels of grating lines. The thickness of each layer can vary with the design and method of construction of the OVD.

"Multi-layer" means at least two layers.

"Planar surface" means the flat surfaces of the layers that are in contact with the opposite and adjacent surfaces of the adjoining layers. Planar surfaces are in distinction to edge surfaces. A rectangular layer or label comprises two planar surfaces and four edge surfaces. A circular layer or label comprises two planar surfaces and one continuous edge surface. A planar surface may be smooth or uneven.

In the context of this invention, terms such as "first planar surface" and "second planar surface" are used in relationship to the typical structure of an OVD. In this context, the substrate layer, if present, is the bottom layer of the OVD, and the first or top surface of the substrate layer is the surface that is in intimate contact with the bottom or second surface of the overlying layer. The bottom or second surface of the substrate is the surface that carries an adhesive, if present, and/or is open to the environment if the OVD is not attached to or made part of an article. Likewise, each overlying layer has a bottom or second surface relative to the substrate or underlying layer and a top or first surface relative to the overlying layer.

"In intimate contact" means that one planar surface of one layer and one planar surface of another layer, or the adhesive layer of a label and the exterior surface of an object or substrate to which the adhesive layer of the label is applied, are in an adhering relationship to one another such as a coating is in an adhering relationship with the substrate to which it is applied.

"Grating microstructure", "microstructure" and similar terms mean a three-dimensional structure of grating lines comprising a material with a high index of refraction embedded (or encapsulated or buried) in a material with a low index of refraction. In the context of this invention, the material is a polymer. If visible reflections are desired, then the spacing of the grating lines are typically in the range of about 100 to about 900 nm. The all-polymer grating microstructure devices of this invention can comprise more than one grating microstructure.

"Grating line" means a line that is a component part of a grating microstructure. The line comprises a high refractive index material and in the context of this invention, the material is a polymer. The lines may be of any cross-sectional shape, are typically arranged in a periodic pattern in which they are parallel to one another, and are embedded within a surrounding low refractive index polymer (although some or all of the gaps between adjacent grating lines may be void or free of the low refractive index material).

In the context of this invention, typically a grating line or pattern of grating lines is formed by one of three methods, i.e., photolithography, embossing, or printing. If photolithography, then the method typically comprises first coating a high refractive index polymer upon a layer of low refractive index polymer. Any number of alternating layers of high refractive index and low refractive index polymers may subsequently be added. A mask material, typically another polymer, is then applied to the top layer of the stack in a pattern so as to cover the areas that will not be etched away. Exposure of the masked structure to laser beams, plasmas, reactive ions, or solvents etches the polymer in the unmasked regions. Depending upon the susceptibility of the polymers to the etchants, a single plane of high refractive index polymer may be structured in this fashion, or a stack of many planes may be etched all the way down to the surface of the substrate. After etching, the mask material may be removed, or if it has the appropriate optical characteristics, it may be left in place. Over-coating with a layer of low refractive index polymer fills in the spaces between the grating lines and encapsulates them, adding to the physical security and robustness of the device. The resulting encapsulated microstructure then represents a single layer of the all-polymer grating microstructure device.

There are many ways in which to use embossing for this invention. Microstructures may be created by UV curing a liquid prepolymer material (typically an acrylate) while it is in contact with a microstructured tool. This method is similar to the manufacturing process used to create textured release liners. Solid polymer layers may be embossed by the application of a microstructured tool under heat and pressure. If a low refractive index layer is embossed in this fashion, the high refractive index polymer may be coated on top of it, so as to fill in the indentations created in the low refractive index layer. If a high refractive index layer is embossed by the application of a microstructured tool under heat and pressure, a low refractive index layer may be coated on top of it to fill in the indentations and possibly to cover the entire surface to serve as a protective coating.

Alternatively, a high refractive index polymer layer may be coated on top of a low refractive index polymer layer, or a stack of multiple alternating layers may be coated, prior to the embossing step. Under heat and pressure, the embossing tool may then be used to push the top layer down into the layer below it. If sufficient pressure is applied to a multilayer stack, many layers may be pushed down into the layers below them, creating multiple layers of microstructures simultaneously. Over-coating with a layer of low refractive index polymer fills in the spaces between the grating lines and encapsulates them, adding to the physical security and robustness of the device. Here again, the resulting encapsulated microstructure then represents a single layer of the all-polymer grating microstructure device.

For this invention, printing methods comprise application of a polymer as an ink to underlying layers. Preferably, the high refractive index polymer is used as one of the inks. The high index polymer ink is deposited onto the low index polymer layer in the pattern of the desired microstructure, and this pattern is then covered with a layer of the low refractive index polymer. The low refractive index polymer may either be coated or applied as a printing ink. Here too, the covering polymer not only coats the high refractive index polymer, but it also fills in the spaces within the pattern, and again the resulting encapsulated microstructure then represents a single layer of the all-polymer grating microstructure device. By successive printing or printing and coating operations, it is possible to build extremely complex stacks of microstructured layers.

"High refractive index", "index of high refraction", "high index of refraction" and similar terms are defined in relationship of the refractive index of one polymer to the refractive index of another polymer. The high refractive index polymer is the polymer with a refractive index that is at least 0.05 greater than the refractive index of at least one other polymer comprising the all-polymer grating microstructure device.

"Low refractive index", "index of low refraction", "low index of refraction" and similar terms are defined in relationship of the refractive index of one polymer to the refractive index of another polymer. The low refractive index polymer is the polymer with a refractive index that is at least 0.05 less than the refractive index of at least one other polymer comprising the all-polymer grating microstructure device.

"White light" means light of the visible spectrum, e.g., light with a wavelength between about 400 and about 700 nm.

Figure 1:
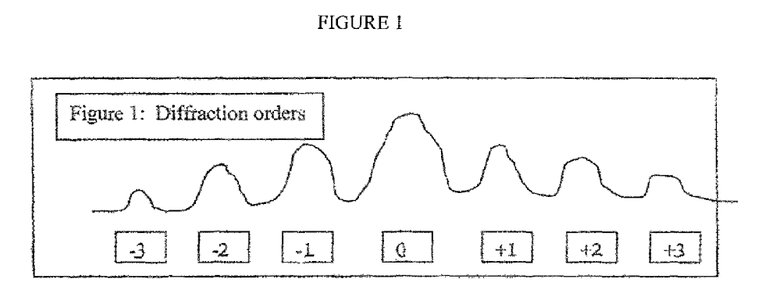
FIG. 1 is a schematic depiction of a spatial arrangement of diffracted peaks.

The interaction of light with a grating microstructure results in the diffraction of light. The spatial arrangement of the diffracted peaks of white light appears as illustrated in FIG. 1. The specular reflection peak is located in the center, and the diffracted peaks to the sides. The peak amplitudes decrease with increasing distance from the specular reflection. The specular reflection is known as the zero-order reflection, and the successive fringes or peaks on each side of the reflection peak are known as diffraction orders of increasing number. The fringes generally decrease in amplitude with increasing diffraction order. Each slit or element of a periodic microstructure causes its own diffractive effect. When the rays diffracted from successive elements are in phase, they reinforce each other. When the rays diffracted from successive elements are out of phase, they cancel out each other. Light with larger wavelengths, e.g., red, diffracts at greater angles than light with shorter wavelengths, e.g., blue. Thus, the gratings cause white light to expand into a complete spectrum with different colors transmitted or reflected in different directions. Hence, the iridescent effects of grating microstructures make them ideal for OVDs.

Diffracted light can be employed in a variety of ways to create an OVD. For example, holography is a first-order diffractive device as the first and higher-order peaks are used for image construction. Alternatively, a zero-order device uses only the specular or zero-order reflection for image construction. In essence, a reflective zero-order device is one in which all unwanted color is diffracted away into the higher orders leaving only the desired colors in the specular reflection.

The colors exhibited by a ZOD depend upon the microstructure of the grating. The cross-sections of several illustrative microstructure embodiments of this invention are depicted in FIGS. 2A-D. Each cross-section is of a single layer of the device, the single layer comprising the microstructure of a high refractive index polymer embedded in a matrix of a low refractive index polymer. The dark areas represent the polymer with the high refractive index, while the white areas represent the polymer with the low refractive index. Variables such as structure period lambda ($\Lambda$), element width $d_1$, element height $d_2$, and the distances between successive rows and/or columns of elements may be used to tailor the optical properties of the device. When the device is viewed parallel to the grating lines, the reflected color is closely related to the structure period. The other variables affect the angular dependence of the observed colors as the device is rotated or tilted.

Figure 2A:
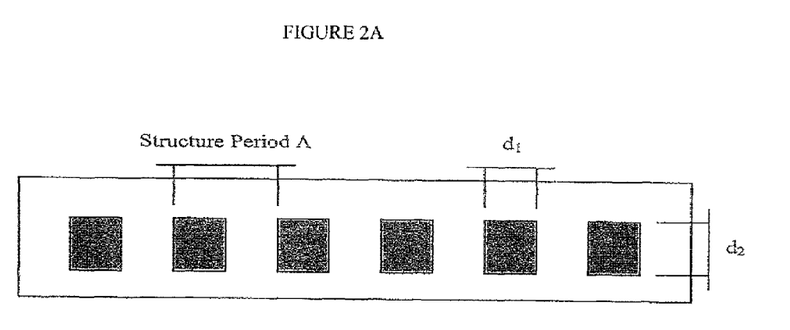
FIGS. 2A-D are schematic depictions of four zero-order devices (ZOD) each with a different microstructure grating configuration.
Figure 2B:
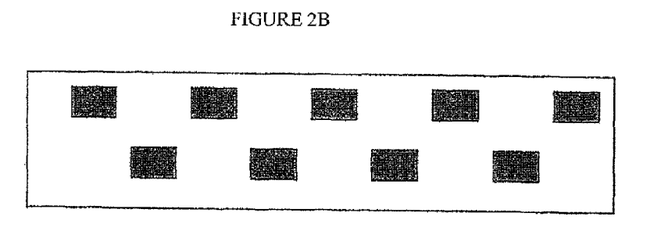
Figure 2C:
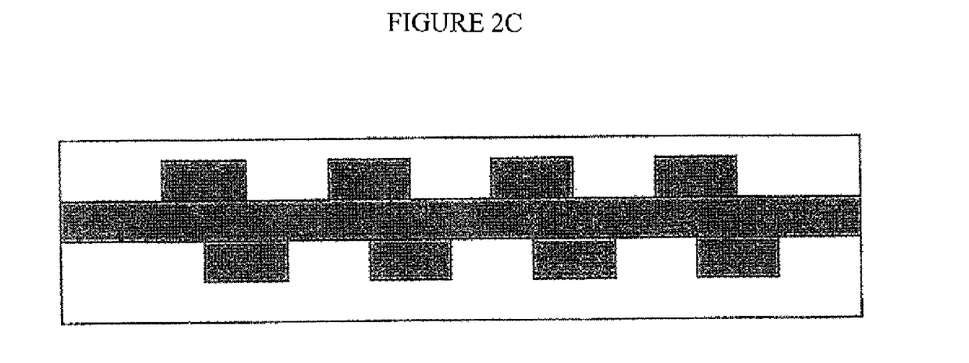
Figure 2D:
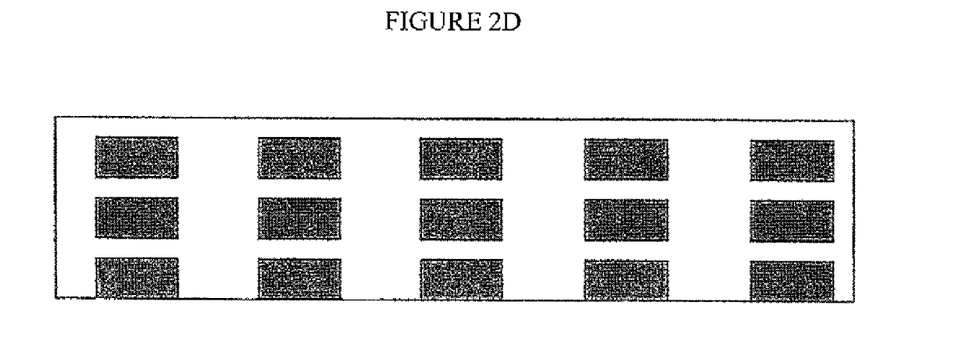

FIG. 2A illustrates a grating microstructure comprising an array of parallel grating lines. In FIG. 2B, the grating microstructure is an array of two stacked parallel grating lines, each row of lines in a separate plane or level within the embedding polymer layer and off-set against the other row of lines. FIG. 2C is FIG. 2B with an intermediate level of high refractive index polymer in contact with and separating each of the two rows of parallel grating lines. In FIG. 2D the grating microstructure comprises an array of three stacked parallel grating lines with each row of lines stacked over one another such that each line of a row is directly over or beneath a line in the row above or below it, and all lines in all rows and columns are parallel to one another. Like FIG. 2B, each row containing the grating lines is separated by a low refractive index polymer. The number of lines and the length and width of the lines can vary to convenience.

Figure 3:
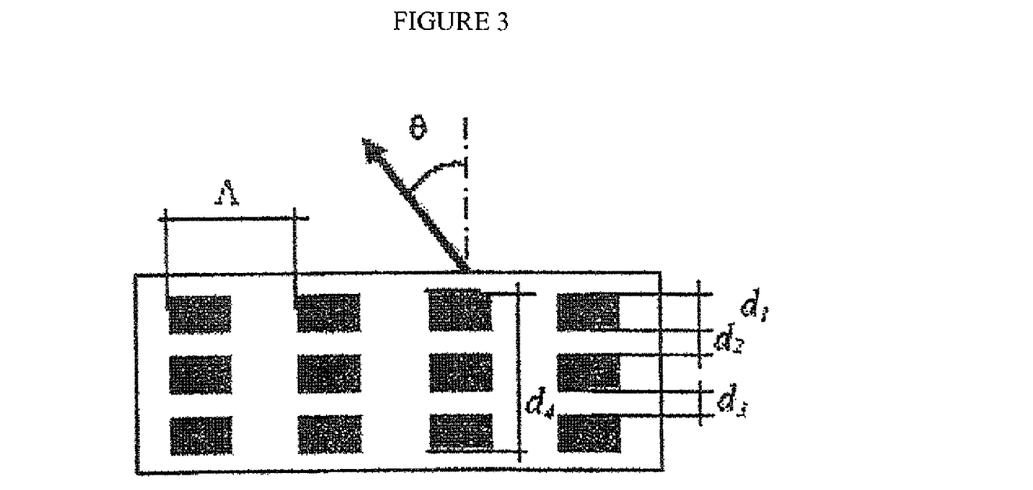
FIG. 3 is a software model of the device of FIG. 2D illustrating the optical effects perceived upon rotation of the model about the surface normal.

An example of the optical effects perceived upon rotation about the surface normal is shown in FIG. 3 for a software model of the structure in FIG. 2D. The structure parameters of the grating microstructure in FIG. 2D are reported in the Table 2D below.

TABLE 2D

Structural Parameters of FIG. 2D Grating Microstructure

| | |
|---|---|
| PERIOD ($\Lambda$) | 420 nm |
| d1 | 150 nm |
| d2 | 450 nm |
| d3 | 200 nm |
| d4 | 1100 nm |
| ANGLE ($\theta$) | 20.5° |

Figure 4A:
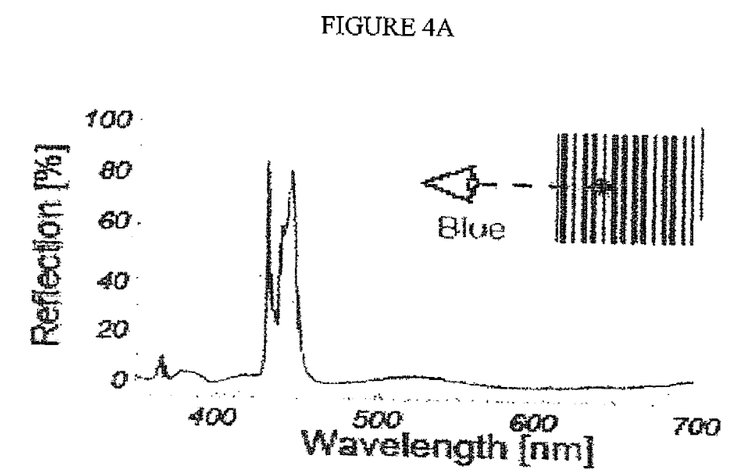
FIGS. 4A-B show the wavelength shift from blue to red by a 90-degree rotation of the device of FIG. 3.
Figure 4B:
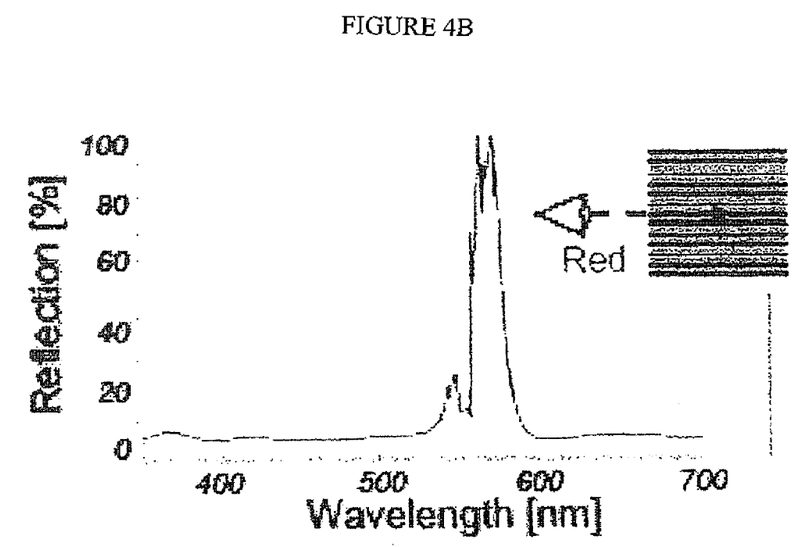

If the grating lines are perpendicular to the direction of reflection, a blue reflection is observed (FIG. 4A). Rotating the device 90° changes the reflected color from blue to red (FIG. 4B). The area under the peaks is essentially proportional to the brightness, or optical "pop", of the image. The more narrow the peaks, the more pure the color of the reflection. The device is viewed by an observer positioned at a non-normal viewing angle. Angle $\theta$ is defined as the angle between a line from the eyes of the observer to the observed spot on the device and a line that is normal to the device surface. When the device is rotated in its plane, the angle $\theta$ is kept constant.

When viewed perpendicular to the grating lines, the reflected peak is centered at a wavelength near the structure period of 420 nm, so a blue color is observed. Upon rotation this peak splits into two. Further rotation causes one peak to move to lower wavelengths and the other to higher wavelengths. After a 90° rotation, one peak has moved into the ultraviolet wavelength region while the other peak has moved into the red-orange wavelength region of the visible spectrum, thus the red-orange color is observed.

This phenomenon can be used to create many types of optical effects. The structure period may be tailored to create any initial spectral color. Alternatively, the initial peak can be in the ultraviolet or infrared region such that no color is observed until the device is rotated or tilted. Also possible is the use of more than one domain of structure period. For example, if three domains with structure periods corresponding to red, green and blue reflections are used, then an optically variable process color image can be created in which pixels of all three colors show different color shifts upon rotation or tilt.

While almost any material can be used as a substrate in the practice of this invention, the preferred substrates are those that are flexible so as to be suitable for roll-to-roll manufacturing operations. Any polymer substrate with a consistent gauge and a reasonable degree of dimensional stability can be employed. Preferred substrates include poly(ethylene terephthalate), polypropylene, poly(ethylene naphthalate), polyimides, cellulosics, acrylics and poly(vinyl chloride). The devices of this invention can be used as a free film, with a pressure-sensitive adhesive, or as a hot stamping foil. Since light-colored substrates reflect light that may interfere with the desired color development, preferably the substrate is black or that a thin layer of black coating is applied to the substrate to absorb all light that is not reflected by the grating microstructure.

The device of this invention requires the use of two or more polymer materials, one or more with a low refractive index and the other with a high refractive index. This difference in refractive indices is the driving force behind the invention, i.e., behind the reflected image formation. Preferably, the difference between the refractive index of the high refractive index polymer and the refractive index of the low refractive index polymer is at least about 0.05, more preferably at least about 0.20 and even more preferably at least about 0.25. Preferably the difference between the refractive index of the high refractive index polymer and the refractive index of the any optional polymer layers is also at least 0.05. In those embodiments of this invention in which the difference between the refractive indices of the high refractive index polymer and the optional polymer is less than 0.05, perhaps even of little or not difference, then the thickness of the optional polymer layer is thin relative to the thickness of the microstructure layer, e.g., of the same thickness or less.

Suitable polymers for the low-refractive index phase or matrix of the device, i.e., the component of the device in which the grating microstructure is embedded or buried, are those with a refractive index preferably below about 1.55, more preferably below about 1.50. Representative low-refractive index polymers include fluoropolymers, silicones, acrylates and acrylate polymers, methacrylates and methacrylate polymers, polyethylene oxide), poly(vinylidene chloride), poly(vinyl ethyl ether), polylvinyl n-butyl ether), poly(propylene oxide), polyethylene glycol), poly(vinyl acetate), cellulose acetate, cellulose acetate butyrate, ethyl cellulose, poly(vinyl butyral) and polypropylene. Preferred low-refractive index polymers include fluoropolymers, silicones, aliphatic acrylates and acrylate polymers, aliphatic methacrylates and methacrylate polymers, polyfethylene oxide) and poly(vinylidene chloride).

Suitable polymers for the high-refractive index component of the devices of this invention, i.e., the grating microstructure, are those with a refractive index preferably above about 1.55, more preferably above about 1.60 and even more preferably above about 1.70. Illustrative high-refractive index polymers include polycarbonate, polystyrene, epoxies, poly (vinyl carbazole), poly(ether etherketone), poly(etherimides), polysulfones, polytpentabromophenyl diacrylate), polyimides and poly(carbodiimides). Preferred high-refractive index polymers include polyphenylsulfones, polyethersulfones, polyimides and poly(carbodiimides).

The high-refractive index may also comprise a filled polymer, e.g., a polymer filled with microspheres of a ceramic material with a high-refractive index. The particles preferably have a diameter small enough such that the particles are optically transparent. Particle diameters of less than about 100 nm are preferred, and particles diameters of less than about 50 nm are more preferred. Typical ceramic fillers include rutile titanium dioxide, anatase titanium dioxide, organotitanates, zinc sulfide and zirconium oxide.

To avoid or minimize the scattering of light, the planar surfaces of each of the polymer layers are smooth, i.e., free or with only minimal amounts of irregularities, roughness or projections. The surfaces of the individual layers during the construction of the all-polymer grating microstructure device can be subjected to various treatments, e.g., corona, to enhance the smoothness of a layer surface before the next layer is applied.

Refractive indices of white light can be measured by any one of a number of known methods. These include ASTM D542, ISO 489, JIS K 7105 and DIN 53491. In the United States, a common and preferred method is ASTM D542 at a wavelength of 589 nm.

The following examples are illustrative of certain, specific embodiments of this invention. Unless otherwise noted, all parts and percentages are by weight.

Specific Embodiments

Buried grating microstructures corresponding to the structure of FIG. 2B were created by successive coating and embossing operations. The base substrate was a 10 mil deep-dyed black polyester film obtained from CPFilms, Inc. The polymers were applied to the polyester and to successive layers using either wire-wound rods or with a Chemat Technology KW-4A Spin Coater. The polymers that were used are identified in Table 2B.

Several additives, such as photo-initiators and flow and leveling agents, were also incorporated into each of the layers. The layers with acrylates required the use of photoinitiators to effect a cure. The initiators used in these examples were Irgacure 184, 369, 819 and 1300, and Darocure 4265, all of which are available from Ciba Speciality Chemicals of Tarrytown, N.Y. Photoinitiator levels ranged from 2 to 8 weight percent, with smaller levels preferred for thicker coatings so as to allow light absorption all the way through the thickness of the film. Flow and leveling agents were used in certain formulations to reduce the number of surface defects and to improve the interlayer adhesion. These included DC19, DC57 and DC 67 available from Dow Coming Corp. of Midland, Mich.; BYK 300, 301, 320, 358, 359, UV 3500 and UV3510 which are available from BYK-Chemie USA of Wallingford, Conn.; Surfynol 104, 420, 440 and 465 available from Air Products and Chemicals, Inc. of Allentown, Pa.; and Modaflow available from Surface Specialties, Inc. of Indian Orchard, Mass. These additives were used at levels of less than 2 weight percent.

Surfaces of substrates and coated layers were subjected to corona treatment to reduce surface defects and to improve interlayer adhesion. In all of the examples, the 10 mil black polyester was washed with isopropanol and then corona treated before application of the first coating layer. The first two low-index polymers and the first five high-index polymers were cast out of a solvent.

Low index polymer layers 3-9 were cured with a mercury arc lamp system from American Ultraviolet (Lebanon, Indiana) at a lamp power of 300 W/in and cure energies of 300-800 mJ/in$^2$. The most common cure energy employed was 600 mJ/in$^2$.

High index layers 1-5 were coated from 10% solutions in N-methyl pyrrolidone. Layers 6-9 were coated from 5-10% solutions in cyclohexanone.

The refractive indices are as reported by the manufacturers of the respective polymers.

TABLE 2B

Material Compatibility and Device Performance

| Example | Low-Index Polymer | Refractive Index | High-Index Polymer | Refractive Index | Layer Compatibility | Flexibility of Structure | Optically-Variable Effect |
|---|---|---|---|---|---|---|---|
| 1 | Cytop 109[a] | 1.34 | Radel R-5000 polyphenylsulfone[d] | 1.67 | Very Poor | — | — |
| 2 | Cytop 109[a] | 1.34 | Radel A-300 polyethersulfone[d] | 1.65 | Very Poor | — | — |
| 3 | 1H, 1H, 5H octafluoro acrylate[b] | 1.35 | Radel R-5000 polyphenylsulfone[d] | 1.67 | Very Poor | — | — |
| 4 | SR256 2-(2-ethylethyl) ethoxyacryclate[c] | 1.44 | Radel R-5000 polyphenylsulfone[d] | 1.67 | Poor | Good | — |
| 5 | SR9003 propoxylated neopentyl glycol diacrylate[c] | 1.45 | Radel R-5000 polyphenylsulfone[d] | 1.67 | Fair | Good | Weak |
| 6 | SR9003 propoxylated neopentyl glycol diacrylate[c] | 1.45 | OptiNDEX A07[e] | 1.76 | Fair | Poor | — |
| 7 | SR9003 propoxylated neopentyl glycol diacrylate[c] | 1.45 | C-Imide HRS[f] | 1.71 | Good | Good | Strong |
| 8 | SR9003 propoxylated neopentyl glycol diacrylate[c] | 1.45 | C-Imide HR 712[f] | 1.71 | Good | Good | Strong |
| 9 | SR9003 propoxylated neopentyl glycol diacrylate[c] | 1.45 | C-Imide HR 751[f] | 1.75 | Good | Fair | Strong |

[a]Available from Asahi Glass Co. Ltd., Tokyo, Japan
[b]Available from Oakwood Products, Inc., West Columbia, South Carolina, USA
[c]Available from Sartomer Company, Exton, Pennsylvania, USA
[d]Available from Solvay Advanced Polymers, L.L.C., Alpharetta, Georgia, USA
[e]Available from Brewer Science, Inc., Rolla, Missouri, USA
[f]Available from Optmate Corporation, Osaka, Japan, and Nitto Denko America, Fremont, California, USA In order to be useful in this invention, the polymer materials must be compatible with each other and with the substrate, so that the microstructure may be formed with little, if any, any gaps due to incomplete wetting or delamination of the interface. Any gaps at interfaces of the microstructure can scatter light and detract from the optical performance. If the grating lines are to be formed by embossing, then either the substrate or at least one of the coated materials must be suitable for embossing under heat or pressure. For use in security label products on a flexible substrate, the structure must also be flexible enough to bend without any cracking or delaminating.

The material combinations that met the conditions outlined in the preceding paragraph were used to create devices corresponding to the structure of FIG. 2B using a structure period of 420 nm. All combinations tested showed some optically variable effect. When viewed perpendicular to the grating lines, the devices appear bright blue. When the security device is rotated in its plane by 90°, a shift to a bright red color is observed. All of these devices are secure to both mechanical and optical copying operations.

Although the invention has been described in considerable detail through the preceding description, drawings and example, this detail is for the purpose of illustration. One skilled in the art can make many variations and modifications without departing from the spirit and scope of the invention as described in the appended claims. All United States patents and published or allowed United States patent applications referenced above are incorporated herein by reference.

What is claimed is:

1. An all-polymer zero-order grating microstructure device that exhibits a zero-order reflection under white light, the device comprising a first polymer having a first refractive index of greater than 1.70 and configured as a microstructure embedded within a second polymer having a second refractive index wherein the microstructure is configured as a row of a plurality of separated and parallel grating lines being adjacently positioned to each other in a single plane, and each grating line is encapsulated and surrounded by said second polymer, each of the polymers of the first and second polymers at least translucent to white light with the proviso that the refractive index of the first polymer is at least 0.20 greater than the refractive index of the second polymer.

2. The device of claim 1 in which the refractive index of the first polymer is at least 0.25 greater than the refractive index of the second polymer.

3. The device of claim 1 in which the microstructure is configured as two off-set rows of parallel grating lines, each row in a different plane within the second polymer.

4. The device of claim 1 in which the microstructure is configured as three or more aligned rows of grating lines, each row in a different plane within the second polymer.

5. The device of claim 1 incorporated into an article.

6. The article of claim 5 in the form of a label, document, currency, credit card, or personal identification paper.

7. The device of claim 1 in which the first polymer comprises a filler that does not scatter visible light.

8. The device of claim 7, wherein the filler comprises microspheres of a ceramic material having a high-refractive index.

9. The device of claim 8, wherein the microspheres comprise a material selected from the group consisting of rutile titanium dioxide, anatase titanium dioxide, organotitanates, zinc sulfide and zirconium oxide.

10. The device of claim 1 in which the second polymer contains one or more voids that do not scatter visible light.

11. The device of claim 1 in which the first polymer is selected from the group consisting of polyethersulfones, polyimides, poly(ether etherketones) and poly(carboiimides).

12. The device of claim 1 in which the first polymer is a polyimide.

13. The device of claim 1 in which the second polymer is situated on a black substrate.

14. The device of claim 13 in which the substrate comprises a black polyester film.

15. A multi-layer, all-polymer zero-order grating microstructure device that exhibits a zero-order reflection under white light, the device comprising as a first layer an opaque substrate having first and second planar surfaces, and a second layer comprising (i) a first polymer having a first refractive index of greater than 1.70 and configured as a microstructure configured as a row of a plurality of separated and parallel grating lines being adjacently positioned to each other in a single plane, each grating line being encapsulated and surrounded by a second polymer having a second refractive index, and (ii) first and second planar surfaces, the second planar surface of the second layer in intimate contact with the first planar surface of the substrate, and each of the first and second polymers of the second layer at least translucent to white light with the proviso that the refractive index of the first polymer is at least 0.20 greater than the refractive index of the second polymer.

16. The device of claim 15 further comprising a third layer comprising a third polymer and having first and second planar surfaces, the second surface of the third layer in intimate contact with the first planar surface of the second layer, the third layer at least translucent to white light with the proviso that the refractive index of the first polymer is at least 0.05 greater than the refractive index of the third polymer.

17. The device of claim 15 in which the refractive index of the first polymer is at least 0.25 greater than the refractive index of the second polymer.

18. The device of claim 15 in which the microstructure is configured as two off-set rows of parallel grating lines, each row in a different plane within the second polymer.

19. The device of claim 15 in which the microstructure is configured as three or more aligned rows of grating lines, each row in a different plane within the second polymer.

20. The device of claim 15 incorporated into an article.

21. The article of claim 20 in the form of a label, document, currency, credit card, or personal identification paper.

22. The multi-layer, all-polymer zero-order grating microstructure device of claim 15, further comprising a third layer comprising the second polymer configured as a microstructure embedded within a third polymer having a third refractive index, the microstructure within the third polymer configured as a row of a plurality of separated and parallel grating lines being adjacently positioned to each other in a single plane with each grating line encapsulated and surrounded by said third polymer, the third layer having first and second planar surfaces, the second planar surface of the third layer in intimate contact with the first planar surface of the second polymer layer, each of the first, second and third polymers at least translucent to white light with the proviso that the refractive index of the second polymer is at least 0.20 greater than the refractive index of each of the first and third polymers.

23. A method of forming an all-polymer zero-order grating microstructure device that exhibits a zero-order reflection under white light, the method comprising the steps of:
  A. Providing a substrate having a planar surface;
  B. Coating the planar surface of the substrate with a first polymer having a first refractive index of greater than 1.70 to form a first polymer layer having first and second planar surfaces, the second planar surface of the first polymer layer in intimate contact with the planar surface of the substrate;
  C. Coating the first planar surface of the first polymer layer with a second polymer having a second refractive index to form a second polymer layer having first and second planar surfaces, the second planar surface of the second polymer layer in intimate contact with the first planar surface of the first polymer layer; and
  D. Forming a microstructure in the first polymer layer from the second polymer of the second polymer layer, the microstructure configured as a row of a plurality of separated and parallel grating lines being adjacently positioned to each other in a single plane with each grating line being encapsulated and surrounded by said second polymer layer;
  each of the polymer layers at least translucent to white light with the proviso that the refractive index of the second polymer is at least 0.20 greater than the refractive index of the first polymer.

24. The method of claim 23 in which the substrate has a low refractive index, and it is coated with the first polymer having a high refractive index of greater than 1.70 to create a layer of high refractive index polymer; and further comprises:
  Masking the layer of high refractive index polymer to create a mask layer in the configuration of a grating microstructure or a partial grating microstructure with masked and unmasked areas of the high refractive index polymer; and
  Removing the unmasked areas of the high refractive index polymer; each of the layers at least translucent to white light with the proviso that the refractive index of the high refractive index polymer is at least 0.20 greater than the refractive index of the low refractive index polymer.

25. The method of claim 23 in which the substrate has a low refractive index and is printed with a high refractive index polymer to create a layer of high refractive index polymer configured as a grating microstructure or a partial grating microstructure; and further comprises:
  Coating or printing the layer of high refractive index polymer with a layer of a second low refractive index polymer,
  each of the layers at least translucent to white light with the proviso that the refractive index of the high refractive index polymer is at least 0.20 greater than the refractive index of the low refractive index polymers.

26. The method of claim 25 in which the first and second low refractive index polymers are the same.

* * * * *